United States Patent
Koulouh et al.

(10) Patent No.: US 12,377,791 B2
(45) Date of Patent: Aug. 5, 2025

(54) DRIVE SYSTEM FOR ROTATING A FIRST DEVICE RELATIVE TO A SECOND DEVICE ABOUT AN AXIS OF ROTATION

(71) Applicant: AML Systems, Paris (FR)

(72) Inventors: Hassan Koulouh, Paris (FR); Santiago Venegas Bayona, Compiègne (FR)

(73) Assignee: AML SYSTEMS, Paris (FR)

( * ) Notice: Subject to any disclaimer, the term of this patent is extended or adjusted under 35 U.S.C. 154(b) by 890 days.

(21) Appl. No.: 17/565,571

(22) Filed: Dec. 30, 2021

(65) Prior Publication Data
US 2022/0118918 A1 Apr. 21, 2022

Related U.S. Application Data

(63) Continuation of application No. PCT/EP2020/069334, filed on Jul. 9, 2020.

(30) Foreign Application Priority Data

Jul. 9, 2019 (FR) .................................. FR1907695

(51) Int. Cl.
*B60R 11/04* (2006.01)
*B60Q 1/00* (2006.01)
(Continued)

(52) U.S. Cl.
CPC ............ *B60R 11/04* (2013.01); *B60Q 1/0023* (2013.01); *B60Q 1/0483* (2013.01); *B60Q 1/076* (2013.01); *B60Q 1/18* (2013.01); *B60R 2011/004* (2013.01)

(58) Field of Classification Search
CPC ......... B60R 11/04; B60R 11/00; B60R 11/02; B60R 2011/004; B60Q 1/0023;
(Continued)

(56) References Cited

U.S. PATENT DOCUMENTS

| 10,604,062 B2 * | 3/2020 | Lang ................. B60Q 1/0023 |
| 2011/0025169 A1 | 2/2011 | Haussecker et al. |
| 2019/0018416 A1 * | 1/2019 | Gassend ............. G05D 1/0246 |

FOREIGN PATENT DOCUMENTS

| DE | 10 2010 001206 A1 | 7/2011 |
| EP | 1739761 A1 | 1/2007 |

(Continued)

OTHER PUBLICATIONS

International Search Report from corresponding PCT Application No. PCT/EP2020/069334 dated Aug. 24, 2020.
(Continued)

*Primary Examiner* — Emily P Pham
(74) *Attorney, Agent, or Firm* — Aird & McBurney LP

(57) ABSTRACT

A drive system for rotating a first device for a vehicle about an axis of rotation relative to the vehicle. The system includes a first support, a second support that is capable of relative movement relative to the first support, a piezoelectric element that is secured to the second support, and the second support and/or the piezoelectric element fixed to the first device, a friction surface; and at least one tip that is secured to the piezoelectric element. The piezoelectric element is configured to impart a movement to of the tip(s) when the piezoelectric element is supplied with an electrical voltage. The tip(s) are configured such that one end of the tip(s) comes into contact with the friction surface during at least a portion of the movement in order to allow relative movement between the first support and the second support about the axis of rotation.

13 Claims, 3 Drawing Sheets

(51) Int. Cl.
    *B60Q 1/04*         (2006.01)
    *B60Q 1/076*      (2006.01)
    *B60Q 1/18*         (2006.01)
    *B60R 11/00*      (2006.01)

(58) Field of Classification Search
    CPC ........ B60Q 1/0483; B60Q 1/076; B60Q 1/18; H02N 2/10
    See application file for complete search history.

(56) References Cited

FOREIGN PATENT DOCUMENTS

| | | |
|---|---|---|
| GB | 2 517 948 A | 3/2015 |
| GB | 2 544 779 A | 5/2017 |
| JP | 2001054289 A | 2/2001 |
| JP | 2012051535 A | 3/2012 |
| JP | 2018049014 A | 3/2018 |
| WO | 2010007837 A1 | 1/2010 |
| WO | WO 2015/064852 A1 | 5/2015 |

OTHER PUBLICATIONS

English Translation of DE 10 2010 01206 from Google Patents dated Dec. 30, 2021.

English Translation of WO 2015/064852 from Google Patents dated Dec. 30, 2021.

\* cited by examiner

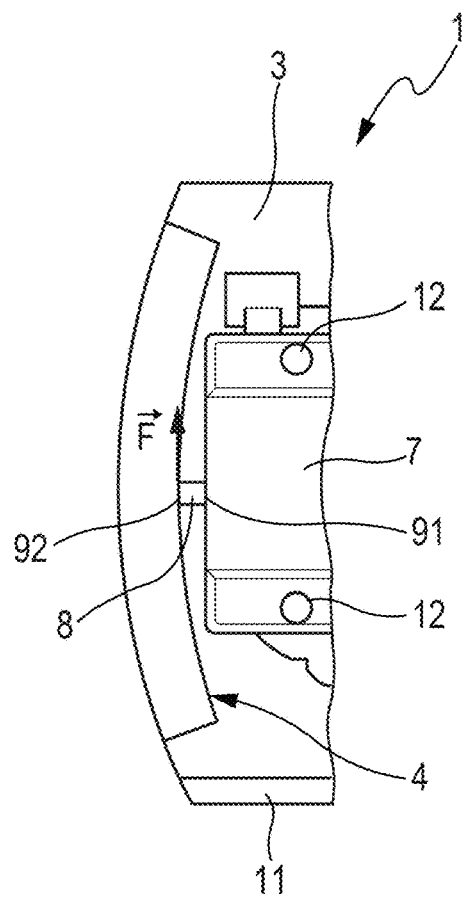
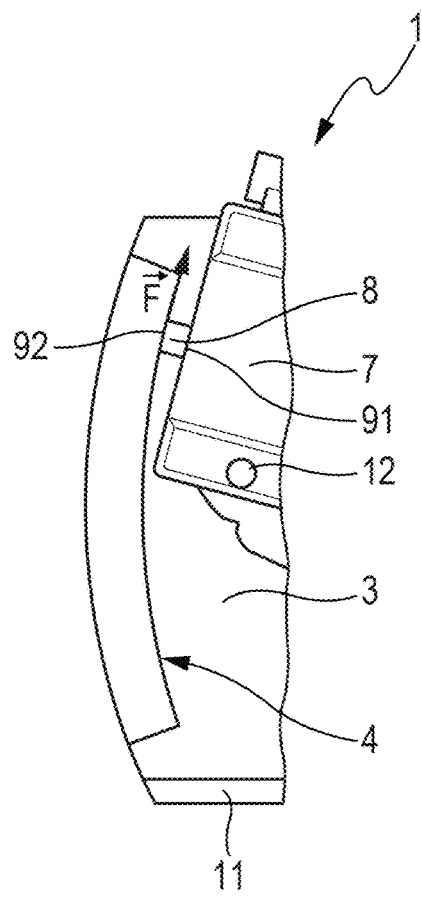
Fig. 4a
Fig. 4b
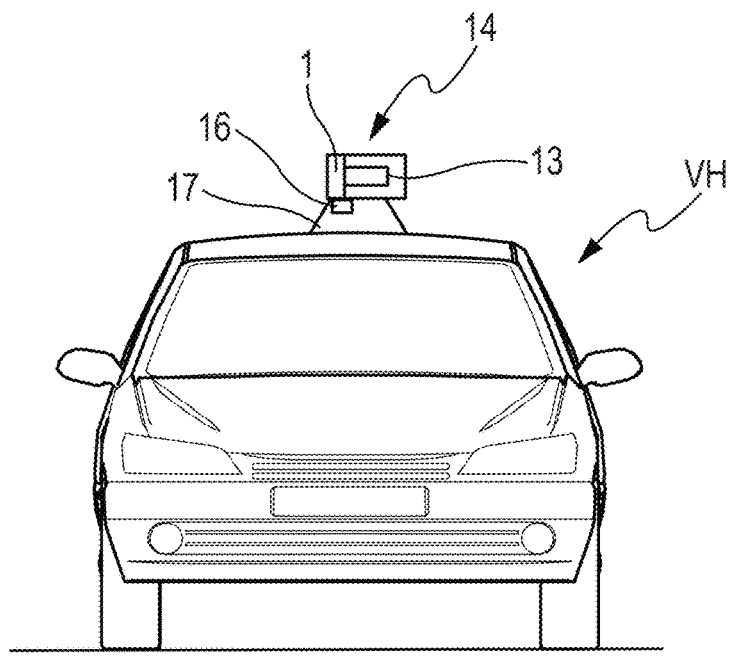
Fig. 5

DRIVE SYSTEM FOR ROTATING A FIRST DEVICE RELATIVE TO A SECOND DEVICE ABOUT AN AXIS OF ROTATION

CROSS REFERENCE TO RELATED APPLICATIONS

This non-provisional patent application is a continuation application of PCT Application No. PCT/EP2020/069334, filed on Jul. 9, 2020, which claims the benefit of French Patent Application No. FR1907695, filed on Jul. 9, 2021, all of which are incorporated herein by reference in their entity.

TECHNICAL FIELD

The present invention relates to the orientation of devices for vehicles, particularly of devices for changing the orientation of the device for a vehicle relative to the vehicle.

PRIOR ART

When a vehicle is in motion, the attitude of that vehicle may change, for example due to the presence of roughness on the ground over which the vehicle is traveling or as a result of driving phases such as braking, acceleration, or changes of direction, etc.

However, certain optical devices on board the vehicle such as headlights or sensors may be sensitive to this change of attitude.

For example, vehicle headlights usually illuminate an area toward which the vehicle is heading. When the attitude of the vehicle changes, the headlight following this change of attitude may illuminate a region other than that toward which the vehicle is heading.

The same observation can be made for an autonomous vehicle. An autonomous vehicle corresponds to a vehicle that is capable of driving without the intervention of a driver. In order to drive safely, the autonomous vehicle is usually equipped with sensors for detecting obstacles in its path. In general, the larger the detection angle of a sensor is, the shorter its detection distance. The detection distance must be sufficient to detect obstacles early enough to avoid them when the autonomous vehicle is traveling at normal speeds. For example, for speeds from 80 km/h to 90 km/h, the necessary detection distance can range from 100 m to 300 m. In order to achieve this detection distance, sensors such as LIDAR ("Laser Detection And Ranging") sensors have a detection angle of from 2° to 3°. The direction of orientation must therefore be precise in order to enable possible obstacles to be detected. When the vehicle is traveling on rough roads or during driving phases that change the attitude of the vehicle, the detection orientation of the sensors may change, which can affect the detection of obstacles. It is then necessary to modify the detection orientation of the sensors so that the orientation remains stable despite the roughness of the road and the driving phases. A level of precision of as little as 1/100° can be required to modify the orientation.

Actuators exist that are capable of modifying the orientation of devices. However, these actuators lack precision and are bulky.

SUMMARY OF THE INVENTION

The object of the present invention is to overcome these drawbacks by proposing a system that enables a sensor orientation to be modified with sufficient precision.

To this end, the invention relates to a drive system for rotating a first device for a vehicle about an axis of rotation relative to a second device that is integral with the vehicle. According to the invention, the system comprises at least:
a first support;
a friction surface;
a second support that is capable of relative movement relative to the first support;
a piezoelectric element that is secured to the second support, and the second support and/or the piezoelectric element fixed to the first device; and
at least one tip that is secured to the piezoelectric element; the piezoelectric element being configured to impart a movement to the tip(s) when the piezoelectric element is supplied with an electrical voltage, the tip(s) being configured such that one end of the tip(s) comes into contact with the friction surface during at least a portion of the movement in order to allow relative movement between the first support and the second support about the axis of rotation.

It is thus possible by virtue of the system to obtain a relative rotational movement having an accuracy of one one-hundredth of a degree thanks to a dynamic and compact drive system.

In one embodiment, the first support remains fixed relative to the vehicle while the second support rotates about the axis of rotation.

In another embodiment, the second support remains fixed relative to the vehicle while the first support rotates about the axis of rotation.

Moreover, the system comprises at least one position sensor that is configured to measure a relative angle between the first support and the second support.

In addition, at least one tip having a first end that is secured to the piezoelectric element and a second end; the friction surface and the axis of rotation are separated by a distance, so that a torque generated by a friction force that is created by the contact of the second end of the tip(s) on the friction surface corresponds to a torque that is required in order for the relative movement to have a predetermined speed and a predetermined acceleration when the second device is secured to the first support and the first device is secured to the second support.

Advantageously, the system further comprises at least one stopper that is secured to the first support, the stopper(s) being configured to limit the relative movement of the second support relative to the first support.

Furthermore, the friction surface having a shape with a cylindrical section having an axis of revolution that is parallel to the axis of rotation, the axis of revolution and the axis of rotation coincide. the tip(s) are hard tip(s); the friction surface being secured to the first support; the piezoelectric element being configured to impart a cyclic elliptical movement to the second end of the hard tip(s) when the piezoelectric element is supplied with an electrical voltage, the hard tip(s) being configured such that the second end comes into cyclic contact with the friction surface during at least a portion of the elliptical movement in order to allow relative movement between the first support and the second support about the axis of rotation.

The invention also relates to a device unit for a vehicle. According to the invention, the sensor unit comprises:
a drive system as specified above;
a first device; and
a control module that is configured to supply the piezoelectric element with an electrical voltage; the second device corresponding to a part of the vehicle, and the signal being a function of control orders received by the control module.

According to a first embodiment, the first device comprises a sensor.

According to an embodiment, the sensor is a LIDAR.

According to a second embodiment, the first device comprises a headlight.

According to a third embodiment, the first device comprises an image acquisition module.

The invention also relates to a vehicle, in particular to an autonomous vehicle, comprising a device unit as described above.

BRIEF DESCRIPTION OF THE FIGURES

The invention, with its features and advantages, will emerge more clearly on reading the description with reference to the appended drawings, in which:

FIGS. 4a and 4b show a schematic close-up view of FIGS. 2 and 3, respectively;

FIG. 5 shows a schematic front view of a vehicle equipped with a device unit for a vehicle comprising a drive system.

DETAILED DESCRIPTION

Figure 1:
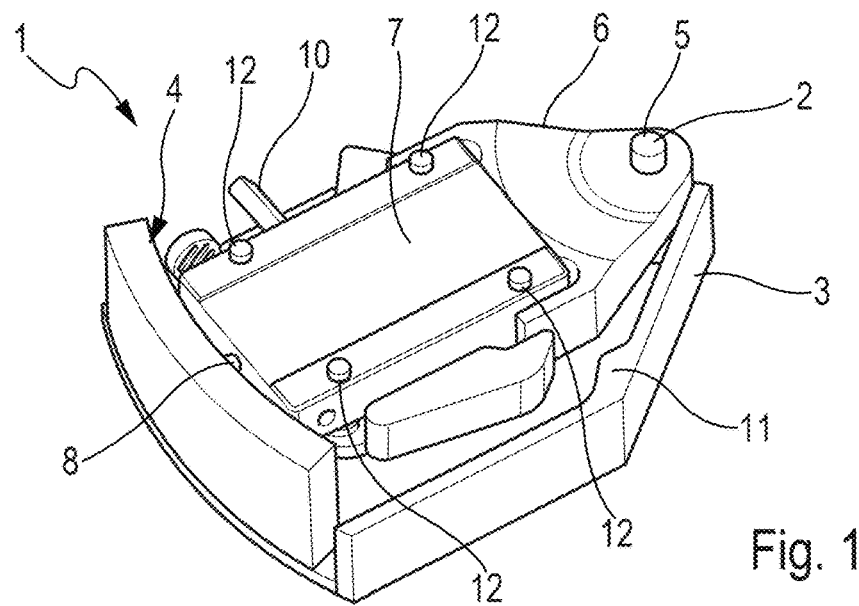
FIG. 1 shows a perspective view of the drive system.
Figure 2:
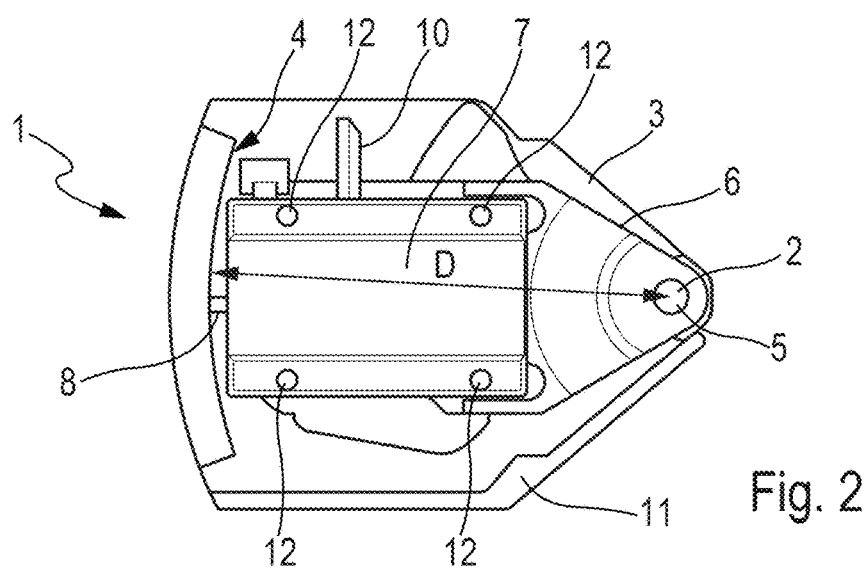
FIG. 2 shows a top view of the drive system in which the first support and the second support are in a first relative position.
Figure 3:
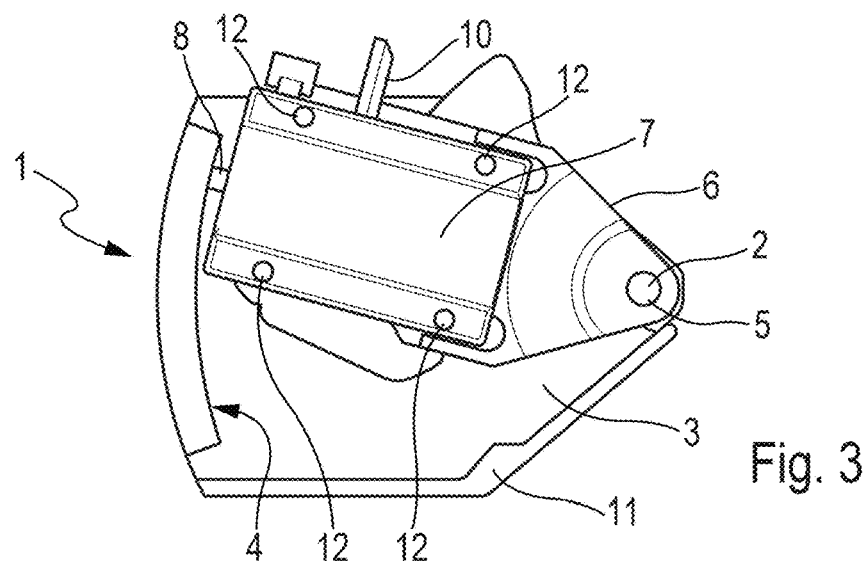
FIG. 3 shows a top view of the drive system in which the first support and the second support are in a second relative position.

The drive system 1 is shown in FIGS. 1 to 3.

The drive system 1 is configured to rotate a first device D1 for a vehicle VH about an axis of rotation 2 relative to a device D2 that is integral with the vehicle VH.

The device D1 can correspond to an optical device or an orientable device.

According to a first embodiment, the device D1 comprises a sensor 13.

According to a second embodiment, the device D1 comprises a vehicle headlight (headlamp).

According to a third embodiment, the device D1 comprises an image acquisition module.

Figure 6:
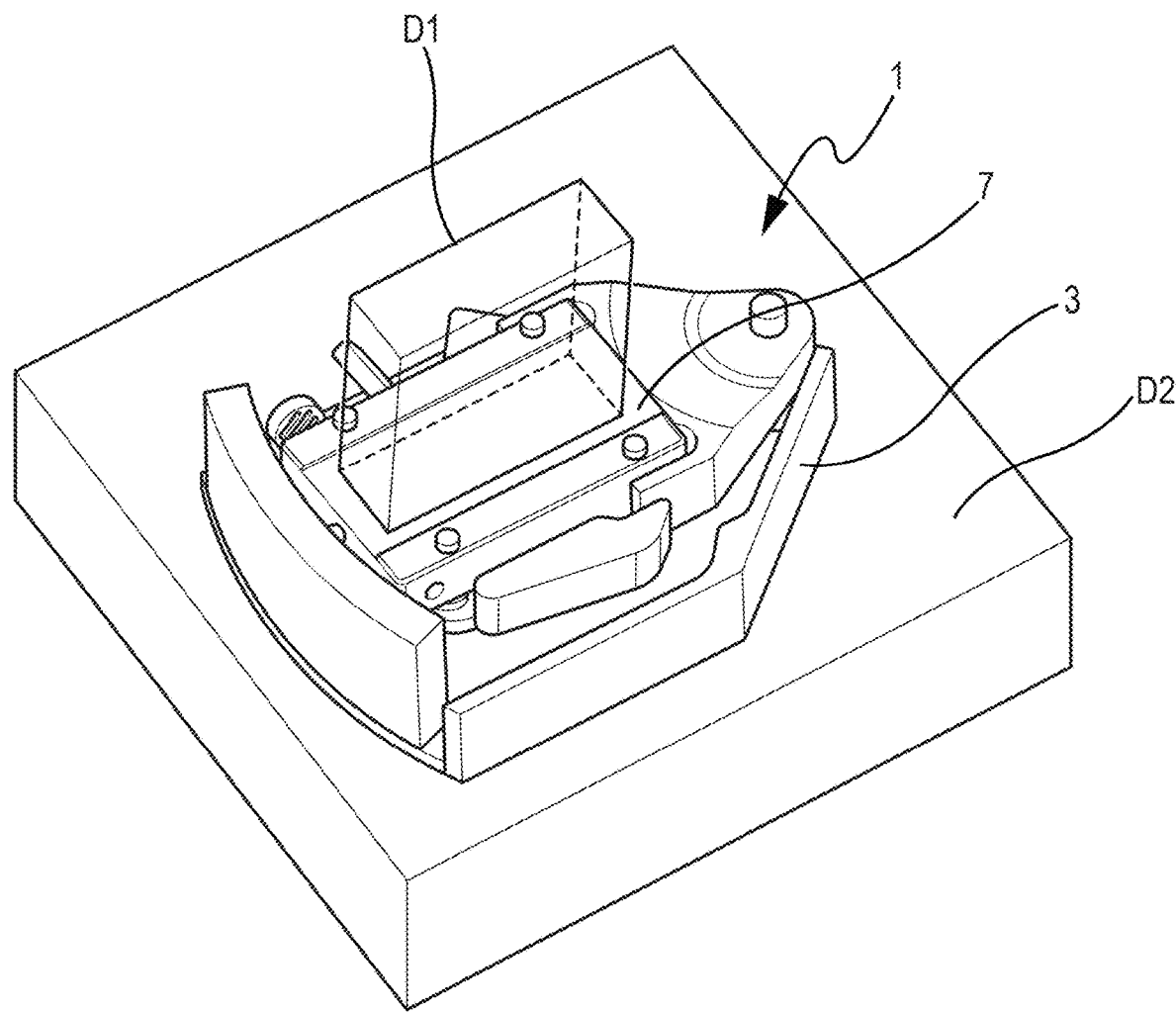
FIG. 6 shows a schematic illustration of the drive system to which the first device for a vehicle and the second device, which is integral with the vehicle, are secured.

The drive system 1 comprises a support 3 that is intended to be secured to the device D2 and a support 6 that is intended to be secured to the device D1. The support 3 and the support 6 are each able to rotate about the axis of rotation 2. FIG. 6 shows a schematic illustration of the devices D1 and D2 secured to their respective supports 3 and 6.

The drive system 1 can be configured to rotate the support 3 about the axis of rotation 2 relative to the support 6. The drive system 1 can also be configured to rotate the support 6 about the axis of rotation 2 relative to the support 3.

The drive system 1 also comprises a friction surface 4 having a shape with a cylindrical section having an axis of revolution 5 that is substantially parallel to the axis of rotation 2.

According to one variant, the axis of revolution 5 and the axis of rotation 2 can coincide substantially.

According to another variant, the axis of revolution 5 is near the axis of rotation 2. Without limitation, if the axis of revolution is close to the axis of rotation, it means that the distance between the axis of revolution 5 and the axis of rotation 2 is less than or equal to 2 mm.

The friction surface 4 can be secured to the support 3. The cylindrical shape of the cylindrical section, part of which forms the friction surface 4, corresponds to a straight cylinder. The friction surface 4 may correspond to an interior surface of a portion of tube in the form of a section of a straight cylinder.

The drive system 1 further comprises a piezoelectric element 7 that is secured to the support 6 and at least one tip 8. The tip(s) 8 have an end 91 that is secured to the piezoelectric element 7 and an end 92 (FIGS. 4a and 4b).

The tip or tips 8 can have the shape of a rod having an end 91 and an end 92.

By means of a reverse piezoelectric effect, the piezoelectric element 7 is configured to impart a cyclic elliptical movement to the end 92 of the tip(s) 8 when the piezoelectric element 7 is supplied with an electrical voltage.

The piezoelectric element can have a generally rectangular shape.

The piezoelectric element 7 is supplied with electrical voltage via an electrode 10.

When a specific electrical voltage is applied to the electrode 10, an oscillation is created according to a longitudinal primary oscillation mode. In this primary oscillation mode, the piezoelectric element 7 elongates and retracts cyclically along a longitudinal axis of the piezoelectric element 7. Furthermore, an oscillation is created according to a transverse secondary oscillation mode, which has the effect of bending the piezoelectric element in a direction perpendicular to the longitudinal axis of the piezoelectric element. The combination of the two oscillation modes enables the whole piezoelectric element to be vibrated and to create the cyclic elliptical movement of the end 92 of the tip or tips 8. The specific electrical voltage has a frequency that can be substantially equal to a resonant frequency of the piezoelectric element 7.

The tip or tips 8 are configured so that the end 92 comes into cyclic contact with the friction surface 4 during at least a portion of the elliptical movement. This contacting of the end 92 of the tip(s) 8 on the friction surface 4 makes it possible to generate a relative movement between the support 3 and the support 6 about the axis of rotation 2 through friction of the end 92 of the tip(s) 8 on the friction surface 4 (secured to the support 3). Advantageously, the tip(s) 8 are hard tip(s) 8.

According to a first example, the support 3 can remain fixed relative to the vehicle VH while the support 6 rotates about the axis of rotation 2. According to a second example, the support 6 can remain fixed relative to the vehicle VH while the support 3 rotates about the axis of rotation 2.

Advantageously, the drive system 1 comprises at least one position sensor (not shown) that is configured to measure a relative angle between the support 3 and the support 6.

The friction surface 4 and the axis of rotation 2 are separated by a distance D (FIG. 2). The distance D is defined such that a torque generated by a friction force $\vec{F}$ created by the contact of the end 92 on the friction surface 4 corresponds to a torque that is required in order for the relative movement to have a predetermined speed and a predetermined acceleration when the device D2 is secured to the support 3 and the device D1 is secured to the support 6 (FIGS. 4a and 4b).

The drive system 1 therefore possesses a mechanism that does not have any play between the two supports 3 and 6, which provides a high level of precision on the order of one one-hundredth of a degree. Furthermore, the drive system 1 has a small footprint, which enables it to be easily integrated into an on-board system in a vehicle VH.

The drive system 1 can also comprise at least one stopper 11 that is secured to the support 3. The stopper or stoppers 11 are configured to limit the relative movement of the support 6 relative to the support 3.

For example, the drive system comprises a single stopper 11 for limiting the relative movement between the support 6 and the support 3 in one direction of the relative movement. It can also include two stoppers 11 for limiting the relative movement between the support 6 and the support 3 in two opposite directions of the relative movement.

The invention also relates to a device unit 14 for a vehicle VH.

The device unit 14 comprises:
a drive system 1,
a device D1; and
a control module 16 that is configured to supply the piezoelectric element 7 with an electrical voltage.

The device D2 thus corresponds to a part 17 of the vehicle VH.

According to the first embodiment, the device D1 comprises a sensor 13 for an autonomous vehicle VH (FIG. 5). The sensor 13 can be configured to detect obstacles that are likely to be on the path of the vehicle VH. The sensor 13 can correspond to a LIDAR.

According to the second embodiment, the device D1 comprises a vehicle headlight (headlamp).

According to the third embodiment, the device D1 comprises an image acquisition module, such as a camera. The camera can be a passive camera.

The control module 16 makes it possible to control the piezoelectric element 7 as a function of control orders received by the control module 16.

The control orders are determined so as to anticipate the changes in attitude of the vehicle VH so that the orientation of the device D1 remains stable despite the changes in attitude of the vehicle VH. The control orders are determined by a computer on board the vehicle VH, for example. The control orders are determined, for example, on the basis of current data about the driving phase of the vehicle VH and of current data acquired by sensors characterizing the environment of the vehicle VH. The drive system 1 is therefore a dynamic system that takes the behavior of the vehicle VH into account.

The invention also relates to a vehicle VH comprising at least one device unit 14. The orientation of the device(s) D1 of the vehicle VH can be modified using the drive system 1 of the device unit 14 as a function of the roughness of the road or of the driving phases.

The invention claimed is:

1. A drive system for rotating a first device for a vehicle about an axis of rotation relative to the vehicle, comprising:
a first support;
a second support that is movable relative to the first support;
a piezoelectric element that is secured to the second support, and the second support and/or the piezoelectric element fixed to the first device;
a friction surface;
and
at least one tip that is secured to the piezoelectric element; the piezoelectric element being configured to impart a movement to the at least one tip when the piezoelectric element is supplied with an electrical voltage, the at least one tip being configured such that one end of the at least one tip comes into contact with the friction surface during at least a portion of the movement in order to allow relative movement between the first support and the second support about an axis of rotation.

2. The drive system as claimed in claim 1, wherein the first support remains fixed relative to the vehicle while the second support rotates about the axis of rotation.

3. The drive system as claimed in claim 1, wherein the second support remains fixed relative to the vehicle while the first support rotates about the axis of rotation.

4. The drive system as claimed in claim 1, further comprising at least one position sensor that is configured to measure a relative angle between the first support and the second support.

5. The drive system as claimed in claim 1, wherein the at least one tip having a first end that is secured to the piezoelectric element and a second end; the friction surface and the axis of rotation are separated by a distance, a torque generated by a friction force that is created by the contact of the second end of the tip on the friction surface corresponds to a torque that is required in order for the relative movement to have a predetermined speed and a predetermined acceleration when a second device of the vehicle is secured to the first support and the first device is secured to the second support.

6. The drive system as claimed in claim 1, further comprises further comprising at least one stopper that is secured to the first support, the at least one stopper being configured to limit the relative movement of the second support relative to the first support.

7. The drive system as claimed in claim 1, wherein the friction surface having a shape with a cylindrical section having an axis of revolution that is parallel to the axis of rotation, the axis of revolution and the axis of rotation coincide; the at least one tip is a hard tip; the friction surface being secured to the first support; the piezoelectric element being configured to impart a cyclic elliptical movement to the second end of the hard tip when the piezoelectric element is supplied with an electrical voltage, the hard tip being configured such that the second end comes into cyclic contact with the friction surface during at least a portion of the elliptical movement in order to allow relative movement between the first support and the second support about the axis of rotation.

8. A device unit for a vehicle, comprising:
a drive system as set forth in claim 1,
a first device; and
a control module that is configured to supply the piezoelectric element with an electrical voltage;
a second device corresponding to a part of the vehicle, the signal being a function of control orders received by the control module.

9. The device unit as claimed in claim 8, wherein the first device comprises a sensor.

10. The device unit as claimed in claim 9, wherein the sensor is a LIDAR.

11. The device unit as claimed in claim 8, wherein the first device comprises a headlight.

12. The device unit as claimed in claim 8, wherein the first device comprises an image acquisition module.

13. A vehicle, comprising at least one of the device unit as claimed in claim 8.

\* \* \* \* \*